G. J. LETCHWORTH.
SAFETY APPLIANCE.
APPLICATION FILED APR. 4, 1919.

1,386,342.

Patented Aug. 2, 1921.

INVENTOR
Geoffrey J. Letchworth
BY
J. Wm Ellis
ATTORNEY

UNITED STATES PATENT OFFICE.

GEOFFREY J. LETCHWORTH, OF BUFFALO, NEW YORK.

SAFETY APPLIANCE.

1,386,342.  Specification of Letters Patent.  Patented Aug. 2, 1921.

Application filed April 4, 1919. Serial No. 287,440.

*To all whom it may concern:*

Be it known that I, GEOFFREY J. LETCHWORTH, a citizen of the United States of America, residing in the city of Buffalo, county of Erie, and State of New York, have invented certain new and useful Improvements in Safety Appliances, of which the following is a full, clear, and exact description.

My invention relates generally to safety appliances, and more particularly to appliances to be used in connection with the cradles or supports for crucibles, wheelbarrows, and other similar devices and vehicles.

It is well known to those skilled in the art that when carrying a crucible filled with molten metal, the hand of the workman many times comes in contact with some object about the foundry, which not only causes injury to the workman's hand, but sometimes results in his letting go of the crucible, or support bearing the crucible, thereby allowing one side of the support to be tipped, and many times spilling all or a part of the contents of the crucible. This often results in serious injury to the workman and damage to property.

In producing my invention, I have sought to provide a safety appliance in the form of a guarded handle which may be attached to, or made a part of, the usual crucible cradle, or to the handles of wheelbarrows and like appliances, and by the use of which the accidents above referred to may be greatly minimized.

Another object has been to provide an appliance of this nature which shall be simple and cheap to manufacture, and one which may be very easily and quickly attached to foundry devices.

The above objects and advantanges have been accomplished by the device shown in the accompanying drawings, in which.

Figure 1:
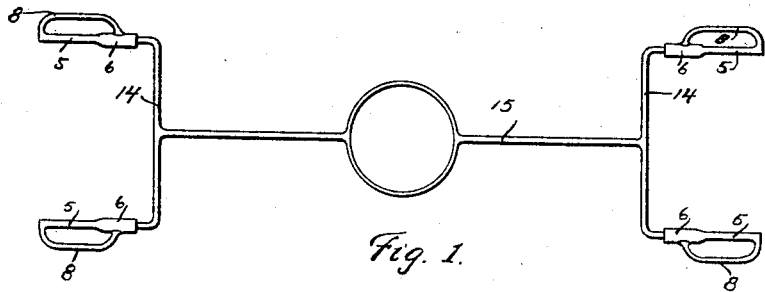
Figure 1 is a plan view of a crucible cradle or support with my appliance attached.
Figure 2:
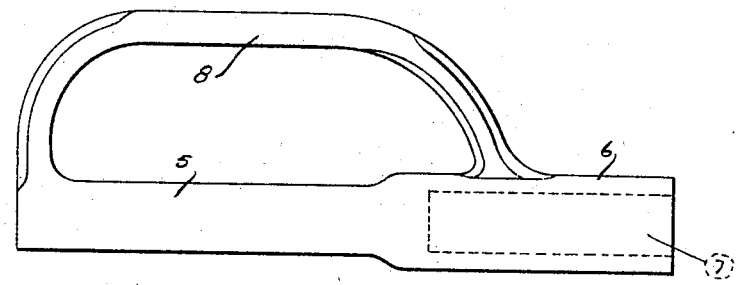
Fig. 2 is an enlarged plan view of my improved appliance.

The form of the device shown in Figs. 1 and 2 comprises preferably a handle portion 5 having an inwardly projecting portion 6. This portion is provided with a cored opening 7, thereby forming a socket. 8 is a guard, which is preferably arranged parallel with the handle portion 5, and is connected at one end to the outward end of the handle 5, and at the other end to the socket or inwardly extending portion 6. The appliance is conveniently formed from cast metal, and may therefore be cheaply and quickly made. The portion 6, with its centrally arranged opening 7, is placed over the usual handles on the fork 14 of the crucible cradle 15, and may be secured thereto by spot welding or other suitable means. The appliance is preferably arranged with the guard at the outside of the cradle, or other device to which it is attached, so that, if the workman should strike any object, the guard will take the force of the impact and the sloping connection of the inner end of the guard with the socket member will gradually push the handle away from the interfering object.

Figure 3:
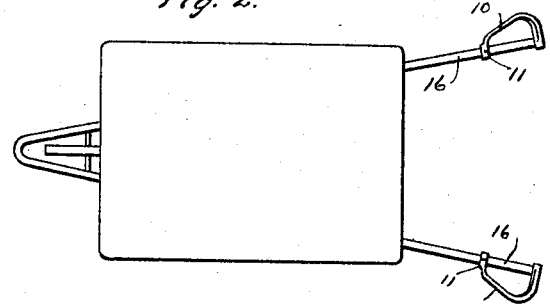
Fig. 3 shows a modification of my device adapted for and applied to a wheelbarrow.
Figure 4:
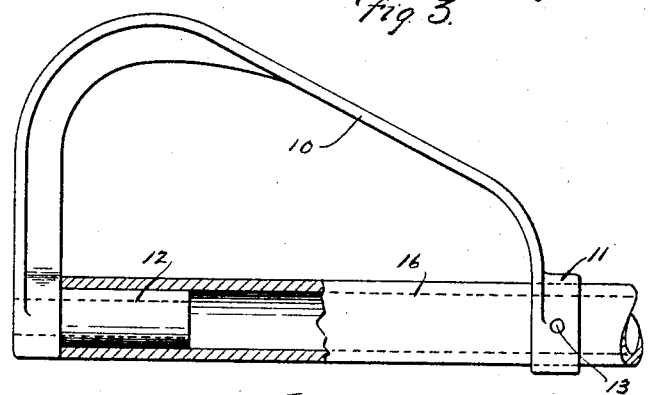
Fig. 4 is an enlarged view of the form of appliance shown in Fig. 3.

The form of the invention shown in Figs. 3 and 4 may be used in connection with wheelbarrows and like devices, where the handles of such devices are made of tubing, and therefore hollow. In this form of the device the regular handle 16 of the wheelbarrow is used, and the appliance provides for a guard about this handle. In this form, 10 is the guard, which preferably slopes inwardly toward the wheelbarrow handle, and is provided at the inner end with a boss 11. This boss, which is disposed around the wheelbarrow handle, is provided with a central aperture of substantially the same diameter as the diameter of the wheelbarrow handle. The rear end of the appliance is provided with a circular stud 12, which is arranged to enter the inside of the tubing forming the handle of the wheelbarrow. When this form of the device is in position, it may either be welded to the wheelbarrow handle, or fastened thereto by passing a pin 13 through the boss 11 or the stud 12.

Having thus described my invention, what I claim is:

A safety appliance adapted to be attached to a tool handle and consisting of a unitary structure having a handle portion, a guard portion and a socket portion, the guard being arranged adjacent to the handle and in interspaced relation therewith and being secured at one end to the outer end of the handle and at the other end to the socket portion, the socket portion being a continuation of the handle and being recessed at its end to form a socket for the reception of the end of a tool handle.

Dated, Buffalo, N. Y., March 28, 1919.

GEOFFREY J. LETCHWORTH.